Oct. 5, 1937.　　W. H. KASTENS　　2,094,843
ABRADING MACHINE
Original Filed Dec. 6, 1933　　3 Sheets-Sheet 1
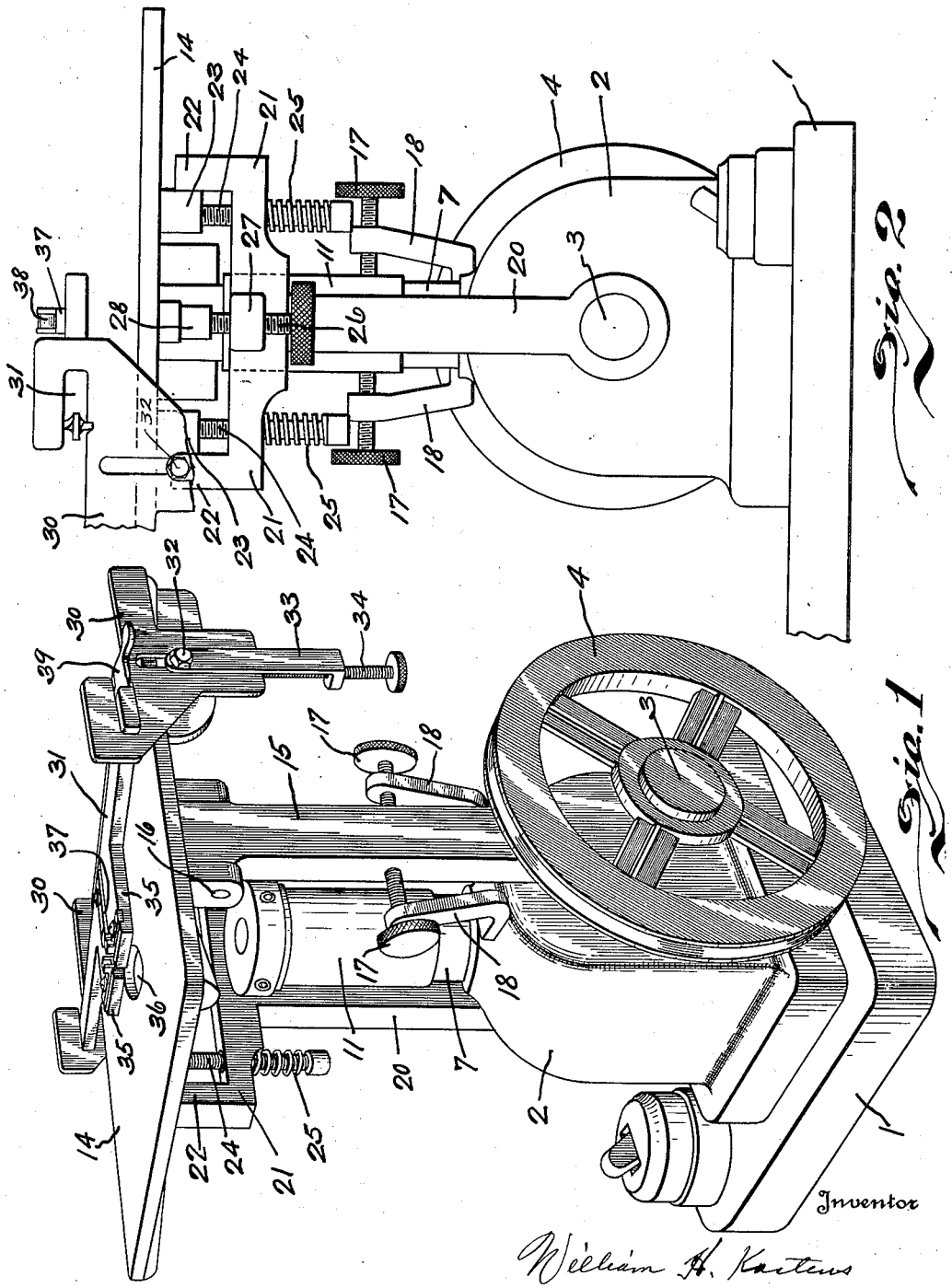

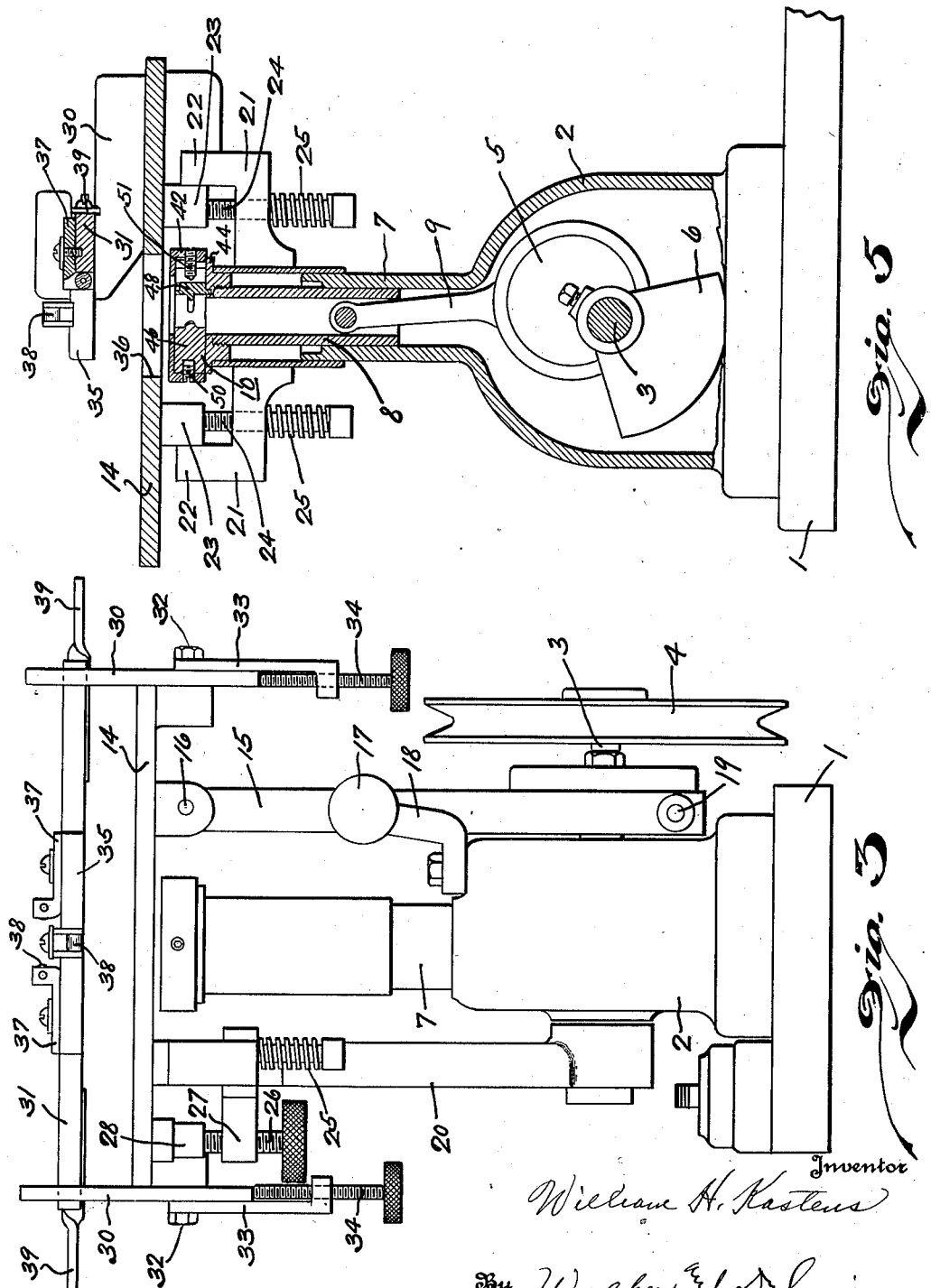

Oct. 5, 1937.   W. H. KASTENS   2,094,843
ABRADING MACHINE
Original Filed Dec. 6, 1933   3 Sheets—Sheet 3
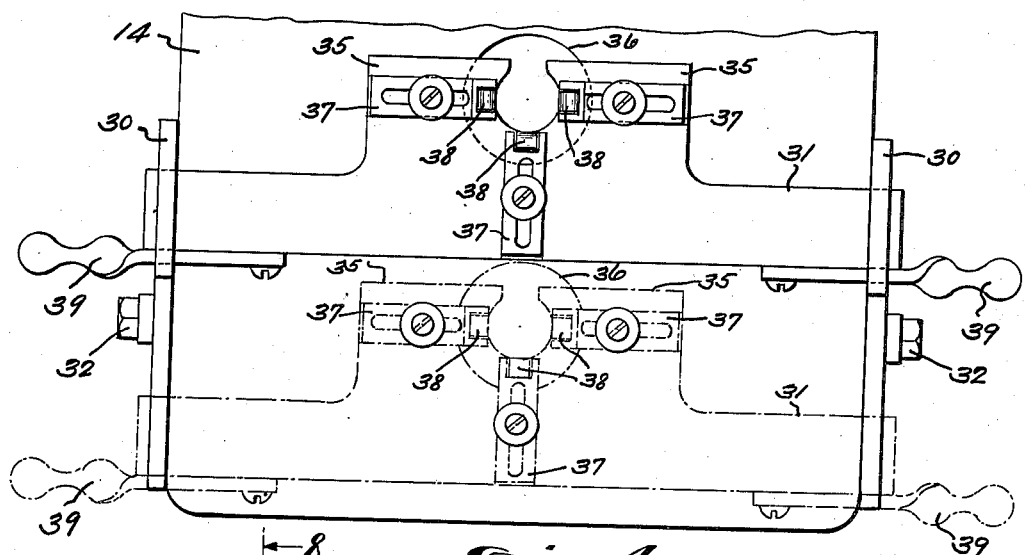
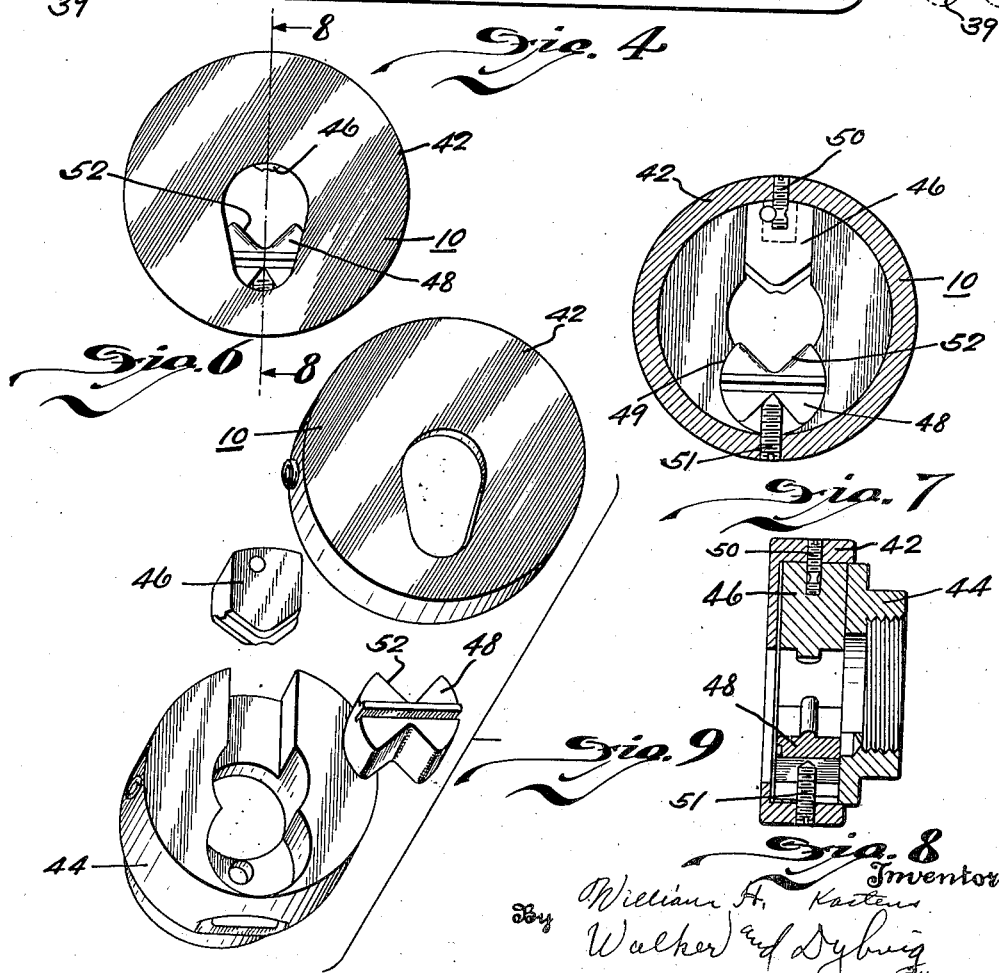
Inventor
William H. Kastens
By Walker and Dybvig
Attorney Patented Oct. 5, 1937

2,094,843

UNITED STATES PATENT OFFICE 2,094,843

ABRADING MACHINE

William H. Kastens, Johnsville, Ohio

Application December 6, 1933, Serial No. 701,125
Renewed September 28, 1936

16 Claims. (Cl. 29—76)

The present invention relates to a universally adjustable support and tool guide for machine tools, which, for illustrative purposes, is herein shown and described as embodied in a filing machine, although obviously applicable to other operating mechanisms, and it is to be understood that the invention is therefore not specifically limited to such application.

In the production of tools and dies, instrument manufacture and other operations requiring great accuracy and precision it is customary to employ filing machines wherein a file or other tool is mechanically actuated in a predetermined path and the work is variously presented thereto in different accurately predetermined positions, in each of which it is highly desirable that the work be firmly supported during the operation.

To this end, the present machine, which embodies a reciprocatory tool carrying chuck adapted for vertical mechanical actuation, is equipped with a work table mounted for tilting movement in different directions under influence of microadjusting devices, and detachably carrying on micro-adjustable support a removable bridging retainer bar or stripper by which the work is held upon the table against movement with the tool and which also serves to support and align the tool in its path of operation.

The object of the invention is to improve the construction, as well as the means and mode of operation of such machines whereby they may not only be economically manufactured, but will be relatively simple in construction, more efficient in use, capable of being easily and accurately adjusted, and unlikely to get out of repair.

A further object of the invention is to provide a universally adjustable support by which the work may be accurately presented to the tool in different predetermined positions.

A further object of the invention is to provide an improved mounting for an adjustable work table and to further provide multi-micro-adjusting means by which changes of position may be accurately determined.

A further object of the invention is to provide improved retaining means for holding the work upon the table while permitting its free movement thereon, and to provide adjustable mounting means therefor in which such retainer is detachably engaged.

A further object of the invention is to provide improved tool holding means for holding the tools in either a fixed or a movable position.

A further object of the invention is to provide a tool holding means adapted to hold a tool in a plurality of positions, said tool holding means permitting the adjustment of the tool.

A further object of the invention is to provide a filing machine or analogous mechanism having the desirable features and advantageous characteristics hereinafter mentioned.

With the above primary and other incidental objects in view, as will more fully appear in the specification, the invention consists of the features of construction, the parts and combinations thereof, and the mode of operation, or their equivalents, as hereinafter described and set forth in the claims.

Referring to the accompanying drawings, wherein is shown the preferred, but obviously not necessarily the only form of embodiment of the invention, Fig. 1 is a perspective view of the assembled apparatus embodying the present invention. Fig. 2 is a side elevation from the side opposite that seen in Fig. 1. Fig. 3 is a front elevation. Fig. 4 is a top plan view. Fig. 5 is a vertical sectional view. Figs. 6 and 7 are respectively a top plan view and sectional plan view of the chuck. Fig. 8 is a cross sectional view of the chuck taken on the lines 8—8 of Fig. 6. Fig. 9 is an exploded view of the chuck.

Like parts are indicated by similar characters of reference throughout the several views.

In the embodiment of the invention, as illustrated in the accompanying drawings, a base 1, upon which may be mounted an electric motor, carries a crank case or housing 2, having in its opposite sides suitable bearings for a transverse drive shaft 3 carrying, exteriorly of the crank case or housing 2, a drive pulley 4. Within the crank case 2, there is mounted upon the drive shaft 3 an eccentric 5 counterbalanced by a segmental weight 6, preferably, though not necessarily, formed integral with the eccentric. Extending vertically from the top of the crank case or housing 2 is a stationary cylindrical bearing sleeve 7, within which is mounted a reciprocatory piston 8 interconnected with the driving eccentric 5 by a pitman 9. At its upper end, the piston 8 carries a suitable chuck 10 to receive a file or other tool, the movement of which in an accurately straight path is insured by the travel of the elongated piston 8 within the guide cylinder 7. As a further precaution there is preferably, though not necessarily, provided an exterior sleeve 11 enclosing and having sliding bearing upon the exterior of the guide cylinder or sleeve 7 and interconnected to move in unison with the piston 8 interiorly of such cylinder or guide sleeve. The chuck 10 will be more fully described later.

As the drive shaft is rotated, the piston 8 and the tool 12 carried thereby are given a rapid reciprocatory vertical motion.

Adjustably located in elevated relation above the crank case or housing 2 is the work table 14 which is hinged at one side to a swingingly adjustable arm 15 journaled upon an exterior hub upon the crank case or housing 2 concentric with the drive shaft 3. The work table 14 is thus mounted for swinging adjustment in a fore and aft direction about the pivotal connection of the vertical arm 15 and is further capable of a transverse tilting movement about its hinged connection 16 with the upper end of the swinging arm 15.

The swinging adjustment of the supporting arm 15 is effected and controlled by a pair of adjusting screws 17 mounted in arms 18 projecting upwardly from the crank case 2 at opposite sides of the swinging arm 15 and carrying at their extremities the adjusting screws 17 which bear on opposite sides of the table supporting arm. By relieving one of the adjusting screws 17 and adjusting the other such screw the arm 15 may be adjusted in either direction to tilt the work table 14, the degree of such tilting adjustment being very accurately determined by the relative adjustment of the respective screws 17. The pivotal connection of the table supporting arm 15 with the crank case hub or boss is preferably by means of a split bearing head which, when the table has been adjusted to the desired position, is contracted to clamp the arm immovably upon the supporting hub or boss by means of the clamp screw 19. To afford ample frictional bearing surface for the contractible head of the swinging arm, the mounting hub or boss is made relatively large. At its opposite side the work table 14 is supported upon a second swinging arm 20, pivotally mounted upon a projecting hub or boss on the opposite side of the crank case or housing 2. This swinging arm 20 moves to and fro in unison with the fore and aft adjustment of the table and in unison with the swinging movement of the table supporting arm 15, but is adjustably connected with the table to allow transverse tilting movement of the table about its hinge connection 16 with the supporting arm 15.

At its upper end, the swinging arm 20 is provided with a bifurcated head consisting of oppositely extending arms 21 having at each end vertical standards 22, between which extend dependent lugs 23 on the under side of the table. The standards 22, engaging with the dependent lugs 23, insure unison swinging movement of the table and arm 20 about the pivotal connection of such arm with the crank case, but permit a relative vertical adjustment of the table by sliding movement of the lugs 23 between the standards 22 carried by the arm 20.

The table is further connected with the arm 20 by means of dependent studs 24, which extend through the lateral arms 21 of the swinging arm 20 and are fixedly engaged in the dependent lugs 23 on the under side of the table 14. These dependent studs are provided at their lower ends with enlarged heads, between which heads and the lateral extensions 21 of the arm 20 are interposed helical compression springs 25. These springs 25 normally tend to depress the work table 14 by exerting downward pressure on the heads of the studs 24, thereby drawing the table 14 downwardly about its hinge connection 16 with the opposite or table supporting arm 15.

Such retractive movement of the table under influence of the springs 25 is resisted by a stop screw 26, threaded in a lug 27 projecting from the arm 20 and having a suitable head 28 bearing against the under side of the table 14. By adjusting the stop screw 26 upwardly, the margin of the table, overhanging the arm 20 is raised against the tension of the retracting springs 25. Conversely upon retracting the stop screw 26, the springs 25 draw the table downwardly about its hinge connection 16 thereby changing the transverse angular relation of the table. The screw 26 affords micro-adjustment for this tilting movement in a transverse direction.

Slidingly mounted on opposite sides of the adjustable table 14 are mounting plates 30 having therein horizontal slots open at their rear ends to receive the end of a transverse bar 31 which bridges the work table and is adjustable relative thereto by vertical adjustment of the supporting plates 30 to retain the work in contact with the table and prevent it from being raised therefrom by the action of the tool.

The supporting plates 30 are vertically slotted, and through such slots studs 32 engage with the work table 14 to support hangers 33 which, at their lower ends, carry adjusting screws 34 bearing against the lower margins of the supporting plates 30 to vertically adjust such plates. When the plates are in their adjusted position, the studs 32 are tightened to clamp the supporting plates 30 between the hangers 33 and the margins of the work table 14 which are downwardly flanged at such position to afford suitable bearing surfaces for the supporting plates.

The bridging bar or retainer 31 is medially provided with a pair of forwardly extending spaced fingers 35 which extend on opposite sides of the file or other tool projecting through the opening 36 in the table, and thus overhang the work presented to the file or tool. By adjustment of the screws 34, the supporting plates 30 are vertically adjusted to raise the fingers 35 of the bridging bar 31 sufficiently to accommodate the work, permitting it to be freely shifted about upon the table 14 beneath the overhanging retaining fingers 35, but retaining it in such plane of movement and preventing the work being raised from the table by the upward movement of the file or such other tool as may be employed. In order to support the tool in its path of reciprocatory movement and afford supporting resistance to the pressure of the work against the file or other tool, adjustable slides 37 are provided upon the bridging bar 31. An antifriction roller 38 is carried at the extremity of the slides 37 which may be adjusted to present the roller 38 in supporting engagement with the tool and is then secured in such position of adjustment.

Inasmuch as it is necessary from time to time to remove the bridging bar, especially when the tool is operating within an opening or enclosure, such bar 31 is detachably mounted in the supporting plates 30 in such position that it may always be returned exactly to the same position relative to the tool and to the table. To this end, the extremities of the receiving slots in the plates 30 form stops against which the margins of the bar 31 are firmly pressed by means of clamp fingers 39 pivoted to the rear margin of the bar 31 and engaging in slightly beveled notches in the bottoms of the bar receiving slots and affording thereby camming action by which the bar 31 is pressed firmly against the ends of the bar mounting slots in the plates 30. The bar is readily and quickly released by oscillation of the locking fingers 39 and its replacement position is accurately gaged by the ends of the receiving slots, against which the bar is pressed.

It will thus be understood that the work table is capable of tilting adjustment fore and aft or laterally, or through any combination of these movements, the degree of adjustment being accurately determined by the various screw regulating means. At the same time the bridging bar may be vertically adjusted relative to the table 14 through micro-degrees by means of the adjusting screws, and the bar is readily removable and replaceable. By such adjustment it is enabled to accommodate a wide range of shapes and sizes of work and to present the work accurately in minute variations of position.

Although any type of chuck may be used, the chuck shown in Figs. 6-9 inclusive has given excellent results. This chuck includes the cup shaped cap 42 mounted upon a support 44 carrying a reciprocating jaw 46 and a reversible jaw 48 diametrically arranged with respect to a centrally located aperture for receiving the tool not shown. The reversible jaw 48 when in the position disclosed in Fig. 8 presents a rounded surface along the edges of the flanges 49 which cooperates with the reciprocatory chuck 46 to hold the tool in a position such that the tool may be adjusted slightly without retracting the screw 50. When the reversible jaw is rotated in this seat after retracting the screw 51 through 180° the tool is chucked against the angular surface 52 of the reversible chuck. When the tool is thus clamped it is held in a rigid position which does not permit of any adjustment. This is permissible when the tool is in perfect alignment with the shank thereof or where perfect alignment is not required. If the shank is not aligned properly with the tool or for some other reason adjustment of the tool is found necessary after clamping, the tool is preferably clamped against the rounded edges of the flanges 49. The chuck has its support 44 threadedly engaging the sleeve 8 as is seen in Fig. 5 and another mode of attaching the chuck may be used if desirable as the above described disclosure is merely a description of the preferred modification.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In an apparatus of the character described, the combination with a tool actuating mechanism, of a work supporting table, a swinging arm to the free end of which the table is hinged for swinging motion about an axis transversely to that of the swinging arm, vertically adjustable supports on the table, a bridging bar detachably carried by the supports, said bridging bar including adjustable members engaging the tool, various adjustments of which accommodate different positions of the table.

2. In an apparatus of the character described, the combination with a tool actuating mechanism, of a work supporting table, a pair of parallel swinging arms mounted for unison oscillation about a common axis, a hinge connection between one side of the table and one of the arms, an adjustable connection longitudinally of the other arm between such arm and the table, and means for adjusting the table by oscillating said arms.

3. In an apparatus of the character described, the combination with a tool actuating mechanism, of a work supporting table, a pair of parallel swinging arms mounted for unison oscillation about a common axis, a recessed head on one of the arms, a projecting portion on the table slidingly projecting within the recess of said head, and opposing screw and spring means for regulating the adjustment of the table relative to the last mentioned arm about its hinge connection with the other arm.

4. In an apparatus of the character described, the combination with a tool actuating mechanism, of a work supporting table, adjustable uprights carried at the opposite sides of the table, a bar carried thereby in elevated bridging relation above the table, said bar being slidably movable on said uprights, stops thereon limiting the relative movement of the bar, and means for securing the bar on the supports.

5. In an apparatus of the character described, the combination with a tool actuating mechanism, of a work supporting table, a pair of swinging arms mounted for unison operation about a common axis, one arm having a sliding engagement with the supporting table and the other arm being pivotally connected to the table so as to have a swinging movement in a transverse direction to the swinging movement of said arms, a means for adjusting this swinging movement of the arms and the swinging movement of the work table about the pivotal connection.

6. In an apparatus of the character described, the combination with a tool actuating mechanism, of a work supporting table, a pair of pivotally mounted arms for supporting said table, said table having sliding engagement with the free end of one arm and pivotally attached to the other arm so that the table swings about one axis due to the oscillation of the arms and about another axis due to the pivotal attachment to said arms, and means for holding said table in adjusted position.

7. In an apparatus of the character described, the combination with a tool actuating mechanism, of a work supporting table, a pair of parallel arms mounted for oscillation about a common axis the free end of one of said arms slidingly engaging the table and the free end of the other arm pivotally supporting the table, means for adjusting one of said arms, independent means for adjusting the table about the pivotal connection to said other arm.

8. In an apparatus of the character described, the combination with a tool actuating mechanism, of a work supporting table angularly adjustable, an adjustable upright carried by said table, a bar carried by said upright in elevated bridging relation above the table, said bar being slidably adjustable on said support, and tool engaging members carried by said bar, said tool engaging members being adjustably mounted to accommodate various angular adjustments of the table.

9. In an apparatus of the character described, the combination of a reciprocating tool holding mechanism with a work support table, a pair of swinging arms arranged substantially parallel to the direction of movement of said tool holding mechanism, said arms being pivotally mounted for adjustment, the table pivotally engaging one arm and slidingly engaging the other whereby the plane of the table may be adjusted at an angle to the direction of the movement of the tool carried by said tool holding mechanism.

10. In an apparatus of the character described, a vertically reciprocatory tool carrier, a work table mounted above the tool carrier and pivotally mounted for tilting adjustment in one direction with relation to the path through which a tool is vertically reciprocated by said carrier, a pivotal mounting for the table about which the table is tiltably adjustable relative to the path of reciprocation of the tool but in a path transversely to the direction of first named tilting movement, the two axes of pivotal movement of the table being different distances from the table, a work guide mounted in adjustable parallel spaced relation with the table and between which guide and the table the work may be slidingly adjusted relative to the path of reciprocatory motion of the tool and tool carrier, said work guide being movable with the table and guide means for the tool carried by the work guide.

11. In an apparatus of the character described, a vertically reciprocatory tool carrier, means for actuating the carrier, a work table beneath which the reciprocatory tool carrier is located, the work table being intersected by the path of travel of the tool supporting means for the table including a pivot spaced from the table and about which the table may be tiltably adjusted in one direction relative to the path of reciprocation of a tool mounted in the carrier, a pivotal connection between the table and the supporting means therefor and about which the table may be tiltably adjusted relative to the path of reciprocation of the tool but in a direction transversely of the first named tilting movement, the two axes of pivotal movement of the table being different distances from the table, a tool guide located above the table and engageable by a tool mounted in the carrier, and a work holder disposed in parallel spaced relation with the top surface of the table beneath which the work is freely adjustable upon the table relative to the tool.

12. In an apparatus of the character described, the combination with a reciprocatory tool actuating mechanism, and a work table substantially perpendicular to the path through which the tool is reciprocated and disposed above the tool actuating mechanism, and adjustable mounting means for the table including a pivot spaced from the table and about which the table may be tiltably adjusted in one direction relative to the path of reciprocation of the tool, a pivotal connection between the table and the supporting means therefor and about which the table may be tiltably adjusted relative to the path of reciprocation of the tool but in a direction transversely of the direction of the first named tiltable adjustment micro-adjusting means for tiltably adjusting the table about said pivots, means for securing the table in any one of various tilted positions, and tool guiding and work holding means carried by the table.

13. In an apparatus of the character described, the combination with a reciprocatory tool carrier and actuating means therefor, of a work table adjustably mounted above and in transverse relation with the path of reciprocation of a tool mounted in the carrier, means for tiltably adjusting the table relative to the path of reciprocation of the tool including a pivot spaced from the table and about which the table may be tiltably adjusted in one direction, a pivotal connection between the table and the supporting means therefor and about which the table may be tiltably adjusted relative to the path of reciprocation of the tool but in a direction transversely of the direction of the first named tiltable adjustment, micro-adjusting means for tiltably adjusting the table about said pivots, a bridging member disposed in parallel spaced relation above the top surface of the table beneath which a work piece may be variously shifted in to different relation with the tool, and a tool guide and support located above the table.

14. In an apparatus of the character described, a reciprocatory tool carrier, actuating means therefor, a work table adjustably mounted in transverse relation with the path of reciprocation of a tool mounted in the carrier, a pair of swinging arms upon which the table is carried for tilting motion, a hinged connection between the table and one of the arms enabling tilting motion of the table in a direction transverse to the swinging motion of the arms, and work holder means carried by the table.

15. In an apparatus of the character described, a reciprocatory tool carrier, actuating means therefor, a work table disposed in transverse relation to the path of reciprocation of a tool mounted in said carrier, a bridging member disposed in elevated parallel relation with the top surface of the work table beneath which a work piece may be shifted to and fro into different relation relative to the path of reciprocation of the tool, and adjustable supports for said bridging member by which the relation of the member to the table may be varied.

16. In an apparatus of the character described, a reciprocatory tool carrier, actuating means therefor, a work table disposed in transverse relation to the path of reciprocation of a tool mounted in said carrier, a bridging member disposed in elevated parallel relation with the top surface of the work table beneath which a work piece may be shifted to and fro into different relation relative to the path of reciprocation of the tool, supports for said bridging member and means for detachably engaging the bridging member with the supports.

WILLIAM H. KASTENS.